(12) United States Patent
Salley et al.

(10) Patent No.: US 10,954,893 B2
(45) Date of Patent: Mar. 23, 2021

(54) ACCUMULATOR DEVICE (71) Applicant: Kohler Co., Kohler, WI (US)

(72) Inventors: Joshua Salley, Cato, WI (US); Louis Lautman, Chicago, IL (US)

(73) Assignee: Kohler, Co., Kohler, WI (US)

( * ) Notice: Subject to any disclaimer, the term of this patent is extended or adjusted under 35 U.S.C. 154(b) by 0 days.

(21) Appl. No.: 16/545,596

(22) Filed: Aug. 20, 2019

(65) Prior Publication Data

US 2020/0072163 A1 Mar. 5, 2020

Related U.S. Application Data (60) Provisional application No. 62/724,960, filed on Aug. 30, 2018.

(51) Int. Cl.
F02M 21/02 (2006.01)

(52) U.S. Cl.
CPC ...... F02M 21/023 (2013.01); F02M 21/0278 (2013.01)

(58) Field of Classification Search
CPC ... F02M 21/02; F02M 21/023; F02M 21/0278
See application file for complete search history.

(56) References Cited

U.S. PATENT DOCUMENTS

| 2,986,881 | A | 6/1961 | Moore |
| 3,521,446 | A | 7/1970 | Maljanian |
| 3,777,480 | A | 12/1973 | Stoltman |
| 3,878,676 | A | 4/1975 | Hitzelberger |
| 3,977,376 | A | 8/1976 | Reid |
| 4,424,676 | A | 1/1984 | Meiners |
| 4,566,422 | A | 1/1986 | Tadokoro |
| 4,612,771 | A | 9/1986 | Ando |
| 5,692,478 | A | 12/1997 | Nogi |
| 6,012,436 | A | 1/2000 | Boutcher |
| 6,357,219 | B1 | 3/2002 | Dudd, Jr. |
| 6,422,015 | B2 | 7/2002 | Long |
| 7,367,320 | B2 | 5/2008 | Komori |

(Continued)

FOREIGN PATENT DOCUMENTS

| CN | 202144761 U | 2/2012 |
| CN | 202338415 U | 7/2012 |

(Continued)

OTHER PUBLICATIONS

European Search Report for European Patent Application No. 19193806.7-1004 dated Nov. 27, 2019.

(Continued)

Primary Examiner — Hieu T Vo
(74) Attorney, Agent, or Firm — Lempia Summefield Katz LLC (57) ABSTRACT An engine includes an intake, an air-fuel path coupled to the intake, an accumulator configured coupled to the air-fuel path and configured to store an air-fuel mixture, and at least one valve configured to selectively provide the air-fuel mixture from the engine to the accumulator at a first time and store the air-fuel mixture within the accumulator at a second time. A controller may be configured to provide commands to the at least one valve. The plurality of commands may include an open command to release air and fuel mixture from the accumulator and a close command to store air and fuel mixture in the accumulator.

20 Claims, 6 Drawing Sheets (56) References Cited

U.S. PATENT DOCUMENTS

| | | |
|---|---|---|
| 8,751,139 B2 | 6/2014 | Barr |
| 8,919,107 B2 | 12/2014 | Nishimura |
| 8,978,378 B2 | 3/2015 | Wade |
| 2002/0014077 A1 | 2/2002 | Long |
| 2003/0041838 A1 | 3/2003 | Tsuchiya |
| 2008/0066467 A1 | 3/2008 | Nemeth |
| 2009/0217898 A1 | 9/2009 | Gokhale |
| 2011/0061633 A1 | 3/2011 | Robinson |
| 2012/0024267 A1 | 2/2012 | Pursifull |
| 2012/0216779 A1* | 8/2012 | Kawano ............... F02N 11/0814 123/447 |

FOREIGN PATENT DOCUMENTS

| | | |
|---|---|---|
| DE | 102007001119 A1 | 10/2007 |
| GB | 672208 A | 5/1952 |
| GB | 1013813 A | 12/1965 |
| GB | 1518883 A | 7/1978 |
| JP | H0447162 A | 2/1992 |
| JP | 2000064932 A | 3/2000 |
| JP | 2007303389 A | 11/2007 |
| JP | 2011052587 A | 3/2011 |
| JP | 2015086809 A | 5/2015 |
| JP | 2015086810 A | 5/2015 |
| KR | 20070083041 A | 8/2007 |
| RU | 2170849 C1 | 7/2001 |

OTHER PUBLICATIONS

European Office Action for European Patent Application No. 19 193 806.7-1004 dated Oct. 26, 2020.

* cited by examiner

ACCUMULATOR DEVICE

CROSS REFERENCE TO PRIOR APPLICATION

This application claims priority benefit of Provisional Application No. 62/724,960 filed Aug. 30, 2018, which is hereby incorporated by reference in its entirety.

FIELD

This disclosure relates in general to an accumulator device in an internal combustion engine.

BACKGROUND

An internal combustion engine converts potential chemical energy in the form of a fuel into mechanical energy. Various fuels are available for internal combustion engines. Some recent developments have focused on alternatives to gasoline and other conventional fuels as efforts toward cleaner burning engines have gained momentum. Other types of fuels, such as gaseous fuels, provide numerous advantages over conventional fuels. Gaseous fuels may produce less emission. Gaseous fuels may cost less for the consumer. Gaseous fuels also present additional considerations in the design of internal combustion engines to optimize energy efficiency, exhaust production, and versatility. One area in which gaseous fuels have presented opportunities for improvements is the fuel delivery system that supplies fuel to the engine.

BRIEF DESCRIPTION OF THE DRAWINGS

Exemplary embodiments are described herein with reference to the following drawings.

DETAILED DESCRIPTION

The following examples describe a fuel delivery system, an internal combustion engine including the fuel delivery system, or an engine-generator set including the fuel delivery system. The fuel delivery system includes an accumulator. The accumulator is a sealed tank, which may be pressurized, and configured to store gaseous fuel. The accumulator may be a hermetically sealed chamber. The gaseous fuel may be liquefied petroleum gas (LPG), hydrogen gas, natural gas, biogas, or another gas. The LPG may be or include primarily butane, primarily propane, or a mixture of hydrocarbon gases. The hydrogen gas may include hydrogen mixed with air or oxygen. The hydrogen gas may be mixed with another fuel when delivered to the engine. Natural gas (e.g., compressed natural gas (CNG)) may be a hydrocarbon gas mixture. Biogas may be a gas produced by the breakdown of organic material. The engine may include a primary fuel chamber. The accumulator may be a secondary fuel chamber. The accumulator may have a predetermined shape (e.g., cylinder). The accumulator may have varying sizes based on the type of engine. For example, the accumulator may be sized proportionally to the displacement of the engine, the number of cylinders of the engine, or another factor. The size of the accumulator may be selected based on the type of fuel.

Figure 1A:
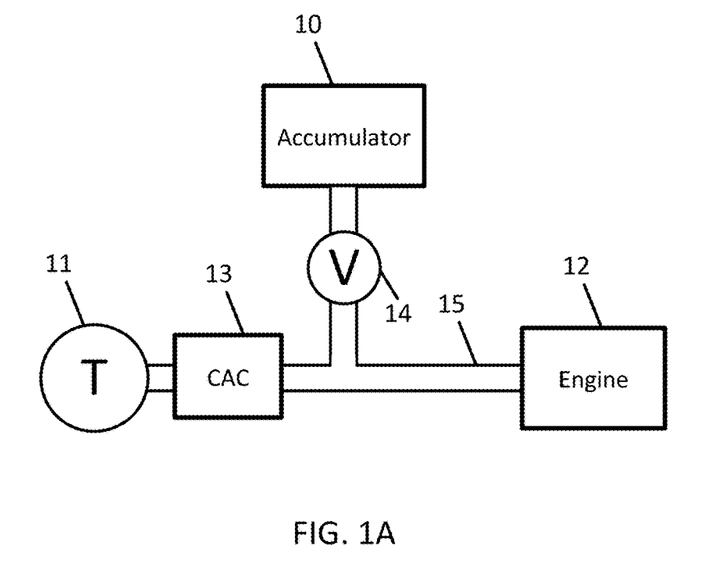
FIGS. 1A and 1B illustrate an engine including an accumulator and a turbocharger with a charge air cooler.
Figure 1B:
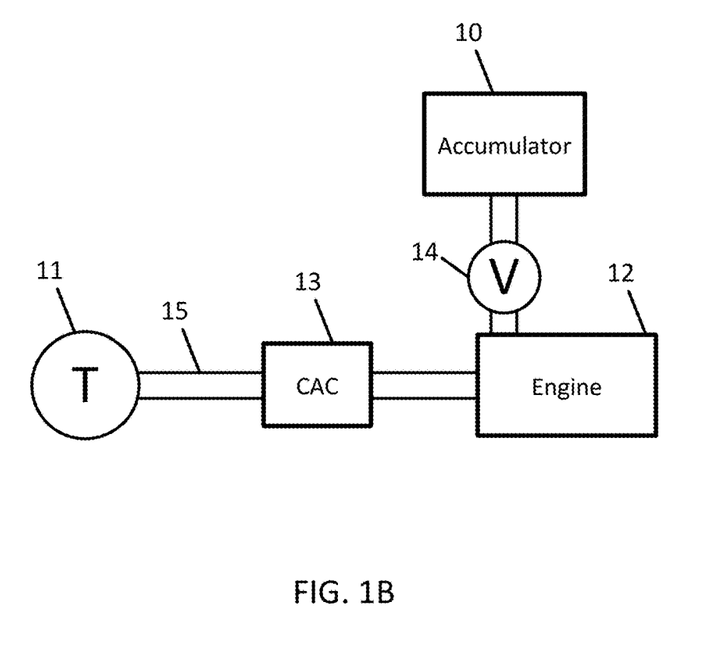
Figure 2A:
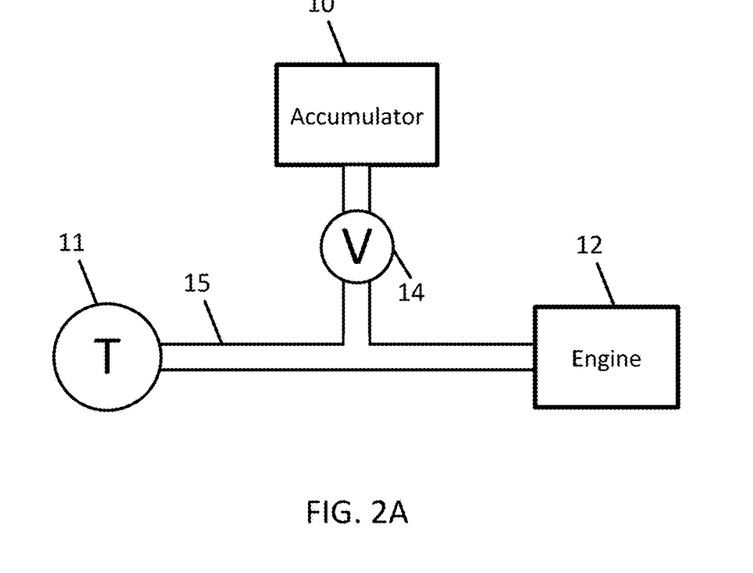
FIGS. 2A and 2B illustrate an engine including an accumulator and a turbocharger without the charge air cooler.
Figure 2B:
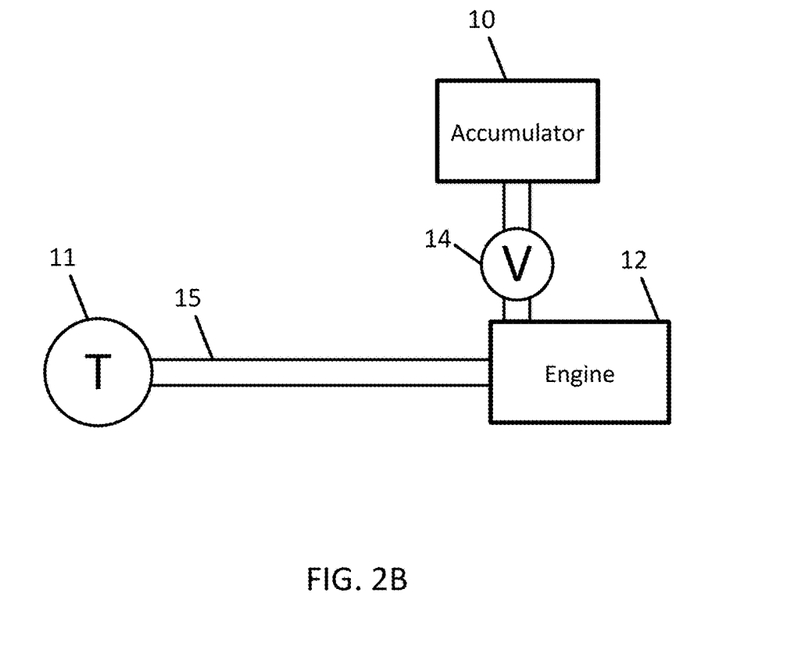

FIGS. 1A and 1B illustrate an engine including an accumulator and a turbocharger with a charge air cooler. FIGS. 2A and 2B illustrate an engine including an accumulator and a turbocharger without the charge air cooler. All of these embodiments include engine 12, an air-fuel passage or path 15 such as a conduit or pipe, and a fuel delivery system, or a fuel and air delivery system, including an accumulator 10. The fuel delivery system also includes a turbocharger 11 and a valve 14.

In FIG. 1A the accumulator 10 is directly coupled with the air-fuel passage 15, which is coupled with the intake of the engine 12. In FIG. 1B the accumulator 10 is directly coupled with the intake of the engine 12. FIG. 2A and FIG. 2B also include a charge air cooler 13. In FIG. 2A the accumulator 10 is directly coupled with the charge air cooler 13, which is coupled with the intake of the engine 12. In FIG. 2B the accumulator 10 is directly coupled with the intake of the engine 12.

The turbocharger 11 may operate as a fan or pump that spins around an axis or an axle. For example, exhaust gas from the engine flows into an exhaust inlet of a turbine housing through an exhaust conduit, and the movement of the exhaust gas drives a turbine. Under the force of the exhaust gas, the turbine, which is coupled to a shaft, rotates the shaft. The exhaust gas may exit the turbine housing through an exhaust outlet. The exhaust gas is the byproduct of the combustion of the air and fuel mixture.

The turbocharger 11 may be a component of a fuel and air delivery system, an internal combustion engine including the fuel and air delivery system, or an engine-generator set including the engine. In an engine, the down stroke of a piston pulls air through low pressure into the cylinder. The amount of air taken into the cylinder compared to the theoretical maximum amount of air that could be taking into the cylinder may be referred as volumetric efficiency. The turbocharger increases the volumetric efficiency of the engine by increasing the density of the air in the air fuel mixture.

Instead or the turbocharger 11, other types of pumps or compressors may be used. The compressor includes a mechanical device that forces has (e.g., air) into a smaller space, which increases the pressure of the gas. For example, the mechanical device may include blades, or a screw to compress the gas.

The shaft of the turbocharger 11 may be coupled to a compressor wheel and may be a centrifugal pump that draws in the mixture of air and fuel to an arrangement of blades before expelling the air and fuel mixture through an outlet to the air-fuel passage 15 and the intake manifold of the engine 12. Alternatively, the centrifugal pump may also mix the air and the fuel such that the centrifugal pump draws in ambient air in through an air inlet and draws in fuel from a fuel inlet. The centrifugal may mix and and spin the air and fuel through the arrangement of blades before expelling the mixture outward and through the air-fuel passage 15 and the intake manifold of the engine.

The turbocharger 11 may be a supercharger. The supercharger may be a compressor that is mechanically driven by the engine. The supercharger may be connected using a belt, a chain, and/or one or more gears to the crankshaft of the engine. In one alternative, the supercharger may be powered by an electric motor. The electric motor may be electrically powered by the battery of the engine, an external battery, or the alternator.

The charge air cooler 13, which may be referred to as an intercooler, is configured to remove compression heat from the air fuel mixture output from the turbocharger 11. Compression heat is the heat added to the air or air and fuel mixture from the compression provided by the turbocharger 11. The temperature of a gas rises as pressure is increased.

The valve 14 is configured to open and/or close a flow between the accumulator 10 and the engine 12. The valve 14 may include a solenoid that moves a plate to open or close the air-fuel passage 15. The valve 14 may include an array of valves. For example, a one-way opening valve may be operable to open the accumulator 10 to receive the air fuel mixture, and a one-way closing valve may be operable to release the air fuel mixture from the accumulator 10.

The accumulator 10 may receive the air fuel mixture that is not combusted by the engine 12. For example, when the engine 12 is turned off, there may be some air fuel mixture in the intake of the engine 12 or in the air-fuel passage 15 that can be captured by the accumulator 10. The valve 14 is opened at a time associated with the engine being turned off to capture this air fuel mixture. The engine control unit may generate a signal indicative of the shutoff of the engine, and the valve 14 operates in response to the shutoff signal. Thus, the valve 14 is configured to operate as a function of the state of the engine 12.

The accumulator 10 may provide the stored air fuel mixture at a time associated with a subsequent ignition of the engine 12. For example, when the engine 12 is turned off next, or subsequently, the valve 14 is opened to release the captured air fuel mixture. The accumulator 10 is closer to the intake of the engine 12 than the fuel supply. Therefore, the released air fuel mixture arrives at the engine 12 more quickly at ignition than an air/fuel supply. Accordingly, the time for ignition of the engine 12 is reduced.

The accumulator 10 and the valve 14 selectively provide the air-fuel mixture from the engine to the accumulator at a first time and store the air-fuel mixture within the accumulator at a second time. Subsequently, the accumulator 10 and the valve 14 provide the air-fuel mixture to the intake at a third time. The first time may be before the second time, and the second time may be before the third time. Over time, the first time, the second time, and/or the third time may repeat in any order.

In one example, the accumulator 10 is signaled to release the air-fuel mixture to the engine 12 at in response to starting the engine 12, for example, at the initial spark event or ignition. For example, the accumulator 10 may be triggered by s start signal or the initial ignition signal or spark event signal from an engine control unit. Subsequently, the accumulator 10 may be signaled to release the air-fuel mixture again subsequently at every start of the engine. The accumulator 10 may be signaled to release the air-fuel mixture depending on the load connected to the engine. In other examples, the engine control unit may directly instruct the accumulator 10 to release the air-fuel mixture at the engine according to other factors. In one example, the accumulator 10 is signaled to release the air-fuel mixture to the engine 12 in response to a type of load that is or will be connected to the engine 12, or an electrical load on a generator coupled to the engine 12. The load may be determined from a sensor at the output of the engine 12 or generator.

Alternatively, the accumulator 10 is signaled to release the air-fuel mixture to the engine 12 based on an external signal. The external signal may describe a power failure corresponding to a building or electrical grid supported by the generator coupled to the engine 12. When the building power system experiences a failure or an emergency, the external signal triggers the accumulator 10 to release the air-fuel mixture to the engine 12 to augment ignition of the engine.

Because the released air fuel mixture arrives at the engine 12 more quickly, the time for ignition of the engine 12 is reduced. A delay results from the air-fuel mixture traveling from the mixer and through the pipework to the engine 12. This delay is reduced or eliminated. The delay that is reduced or eliminated may have a length of time that is based on the track volume of the pipework from the mixer to the engine 12.

In one example, the engine 12 may include multiple accumulators 10 or the accumulator 10 may include multiple chambers each controlled with independent valves. The multiple accumulators 10 allow the air-fuel mixture to be stored in different volumes and/or for release at different times. A first accumulator is used for a first ignition of the engine 12 and a second accumulator is used for a second ignition of the engine 12. The engine 12 may include different accumulators for different types of fuel, which may be sized according to the type of fuel.

Figure 3:
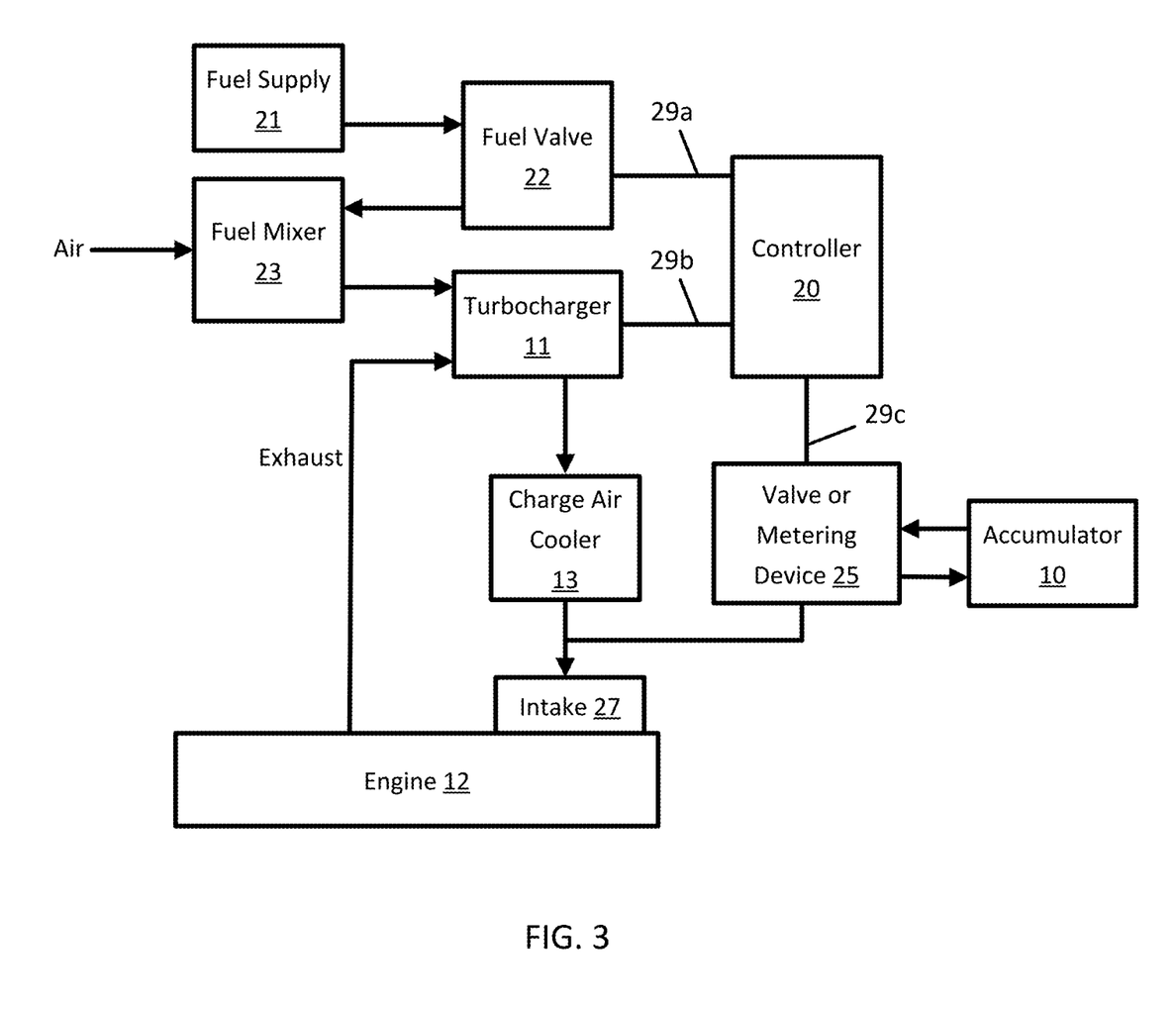
FIG. 3 illustrates a system including a fuel delivery system in combination with an engine including an accumulator and a turbocharger with a charge air cooler.

FIG. 3 illustrates a system including a fuel delivery system in combination with an engine 12 including an accumulator 10 and a turbocharger 11. Optionally, a charge air cooler 13 may be on the air-fuel passage between the turbocharger 11 and the engine 12. The system also includes a fuel supply 21, a fuel valve 22, a fuel mixer 23, a controller 20, an accumulator valve or metering device 25, and an intake 27. Additional, different, or fewer components may be included.

The fuel supply 21 may be a fuel tank that stores gaseous fuel. In some examples, the fuel supply 21 may be referred to as a first fuel tank and the accumulator 10 may be referred to as a second fuel tank. In addition or in another example, the fuel supply 21 includes a pipeline that provides the gaseous fuel to the engine 12.

The fuel valve 22 may be configured to selectively open and close a fuel path from the fuel supply 21 to the fuel mixer 23. The fuel mixer 23 is configured to mix air and fuel. The fuel mixer 23 may include a fuel injector or a carburetor to mix the gaseous fuel with air. The fuel mixer 23 may include a diaphragm and/or a venturi for setting an air to fuel ratio. The mixed fuel may be supplied from the fuel mixer 23 to the turbocharger 11, which spins under the direction of the exhaust from the engine 12.

The controller 20 is coupled to one or more communication paths 29. A fuel valve communication path 29a connects the controller 20 to the fuel valve 22 and carries signals or commands for operation of the fuel valve 22. A turbocharger communication path 29b connects the controller 20 to the turbocharger 11 and carries signals or commands for operation of the turbocharger 11. An accumulator valve communication path 29c connects the controller 20 to the valve 25 and carries signals or commands for operation of the accumulator 10.

The controller 20 provides commands to one or more of the fuel valves 22, the turbocharger 11, and/or the accumulator device or metering device 25. Different commands are provided at different times. The controller 20 may operate based on data received from sensors, one or more user inputs, or a timing schedule. The time schedule may be a predetermined schedule and/or may be defined in response to the one or more user inputs. The user inputs may include an ignition (e.g., a user presses a start button or turns a key) or a shutoff command (e.g., a user presses a top button or turns a key). The user inputs may include a throttle or accelerator. The timing schedule may include a sequence for the combustion cycle, operating the turbocharger, or other operations of the engine 12. The sensor data may be pressure data that describes the pressure inside of the accumulator 10 and the pressure outside of the accumulator 10 (e.g., at the intake 27 or along the air-fuel path 15). The sensor data may be collected by multiple sensors. For example, an internal pressure sensor is configured to collect pressure data from inside the accumulator 10 and an external pressure sensor is configured to collect pressure data from outside of the accumulator 10. The sensor data may include an oxygen sensor, from which the air to fuel ratio is derived. The sensor data may describe the load on the engine 12.

The controller 20 may control the metering device 25 in response to any of the user inputs, timing schedule, or sensor data to cause the metering device 25 to release the stored air fuel mixture in the accumulator 10. The controller 20 is configured to open and close the accumulator 10 as a function of the state of the engine 12. The controller 20 is configured to control the amount of the air fuel mixture released from the accumulator 10 as a function of the state of the engine 12.

The controller 20 may receive data indicative of the ignition of the engine 12. The data may be derived from any of the user inputs, timing schedule, or sensor data. The ignition data may be the ignition command provided by the user. The ignition data may be a timing sequence resulting from the ignition command. The ignition data may include sensor data that is indicative of the ignition of the engine such as an oxygen level measured by an oxygen sensor.

The controller 20 may open the accumulator valve in response to the data indicative of the ignition. The controller 20 may control the metering device 25 in response to the data indicative of the ignition. The controller 20 may access a time period for an amount of time to open the accumulator valve. The controller 20 may access a time period and/or metering amount for operating the metering device 25.

The air fuel mixture is provided from the accumulator 10 to the charge air cooler 13 or directly to intake 27 of the engine 12 in response to the activation of the accumulator valve or the metering device 25.

After the air fuel mixture is provided from the accumulator 10, the controller 20 may instruct the accumulator valve or the metering device 25 to close. The accumulator valve or the metering device 25 is configured to close the accumulator in response to an elapsed time period measured from the ignition of the engine or the shutoff of the engine.

Subsequently, the controller 20 may instruct the accumulator valve or the metering device 25 to open to refill the accumulator 10. The refilling process may occur based on air pressure. That is, the vacuum or difference in pressure caused by opening the accumulator 10 causes the accumulator 10 to refill.

The refilling process may occur when there is excess air fuel mixture in the charge air cooler 13 or intake 27 of the engine 12. The controller 20 may detect the existence of the excess air fuel mixture based on an air fuel sensor or based on a pressure sensor. The controller 20 may determine the existence of the excess air fuel mixture after a particular phase of the combustion cycle. The controller 20 may detect the existence of the excess air fuel mixture in response to a shutoff or a shutoff command for the engine. The shutoff command may be an external command received from the user (e.g., stop button or key turn). The shutoff command may be an internal command generated within the controller 20 to turn off the engine (e.g., in response to a control sequence or failure detection).

The controller 20, or engine control unit, may also control a wastegate for the turbocharger to produce pressure to fill the accumulator 10. The controller 20 is configured to generate a wastegate signal to open and close the wastegate, and optionally, to what degree the wastegate is opened or closed. The wastegate 160 provide a bypass path for the exhaust gas to bypass the turbocharger 11. The wastegate 160 effectively controls the speed of the turbine wheel in the turbocharger 11. By opening and closing the wastegate 160, the pressure available to fill the accumulator 10 is regulated. Thus, the controller 20 may generate a wastegate signal to close the wastegate in order to fill the accumulator 10, or increase the rate of filing the accumulator.

In one example, the accumulator valve is always open (e.g., biased open by a spring) unless it is forces closed by a solenoid or other device. In this example, the controller 20 closes the valve when the engine is off. Thus, the engine is turned on and in response, the accumulator valve is opened, releases the stored air fuel mixture. Later in the combustion cycle or operation of the engine 12, the accumulator 10 is filled based on pressure. The accumulator valve remains open until the engine 12 is shutoff. In response to the shutoff, the controller 20 closes the accumulator valve, capturing the air to fuel mixture, which is stored until the next time the engine 12 is turned on.

In one example, the accumulator valve includes multiple valves or an array of valves. The array of valves may be a single valve assembly with multiple paths and settings. For example, at least one valve is configured to open the accumulator in response to an ignition or an ignition command for the engine, and at least one other valve is configured to open the accumulator in response to a shutoff or a shutoff command for the engine.

In addition, the controller 20 may control the fuel valve 22 in response to any of the user inputs, timing schedule, or sensor data to cause the fuel valve 22 to supply fuel to the fuel mixer 23. In addition, the controller 20 may control the turbocharger 11 in response to any of the user inputs, timing schedule, or sensor data to cause the turbocharger 11 to spin up and provide compresses air and fuel mixture to the intake 27 by way of the charge air cooler 13.

Figure 4:
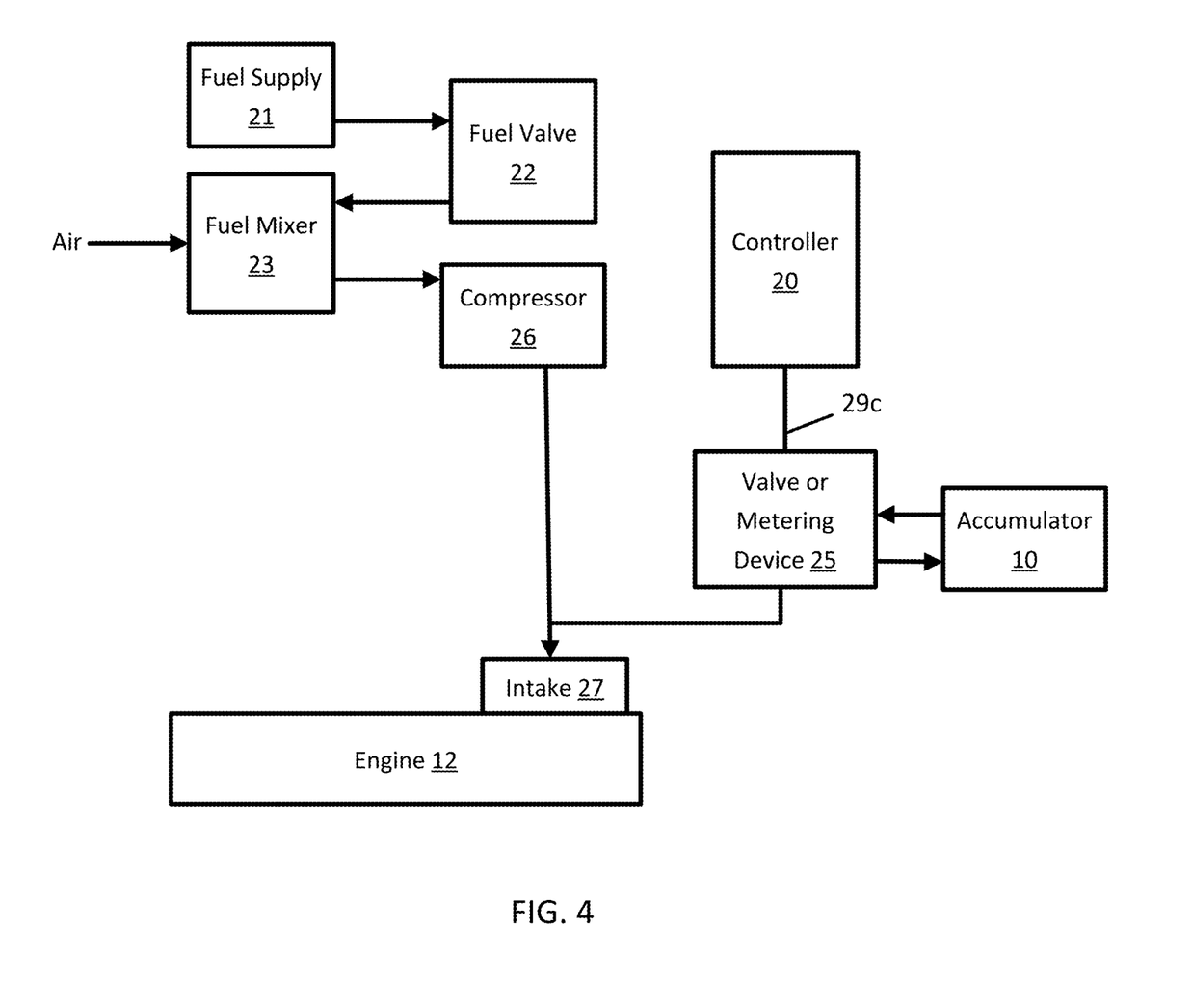
FIG. 4 illustrates a system including a fuel delivery system in combination with an engine including an accumulator and a turbocharger without the charge air cooler.

FIG. 4 illustrates another system including a fuel delivery system in combination with an engine 12 including an accumulator 10. In the embodiment shown in FIG. 4, a compressor 26 pressurizes the air-fuel mixture provided from the fuel mixer 23 and provides the pressurized air-fuel mixture to the air-fuel path and/or the intake 27. In the embodiment of FIG. 4, the compressor 26 may be driven by a mechanical (e.g., gearing) or electrical power source (e.g., motor energized by a battery or alternator) rather than the exhaust of the engine.

In the embodiment of FIG. 4, the controller 20 may be a dedicated controller for the accumulator. For example, the controller 20 may not control the fuel valve 22, the turbocharger 11 or the compressor 26. The controller 20 may be coupled to the accumulator valve communication path 29c for providing signals or commands to the valve 25 that opens or closes the path between the intake 27 and the accumulator 10.

Figure 5:
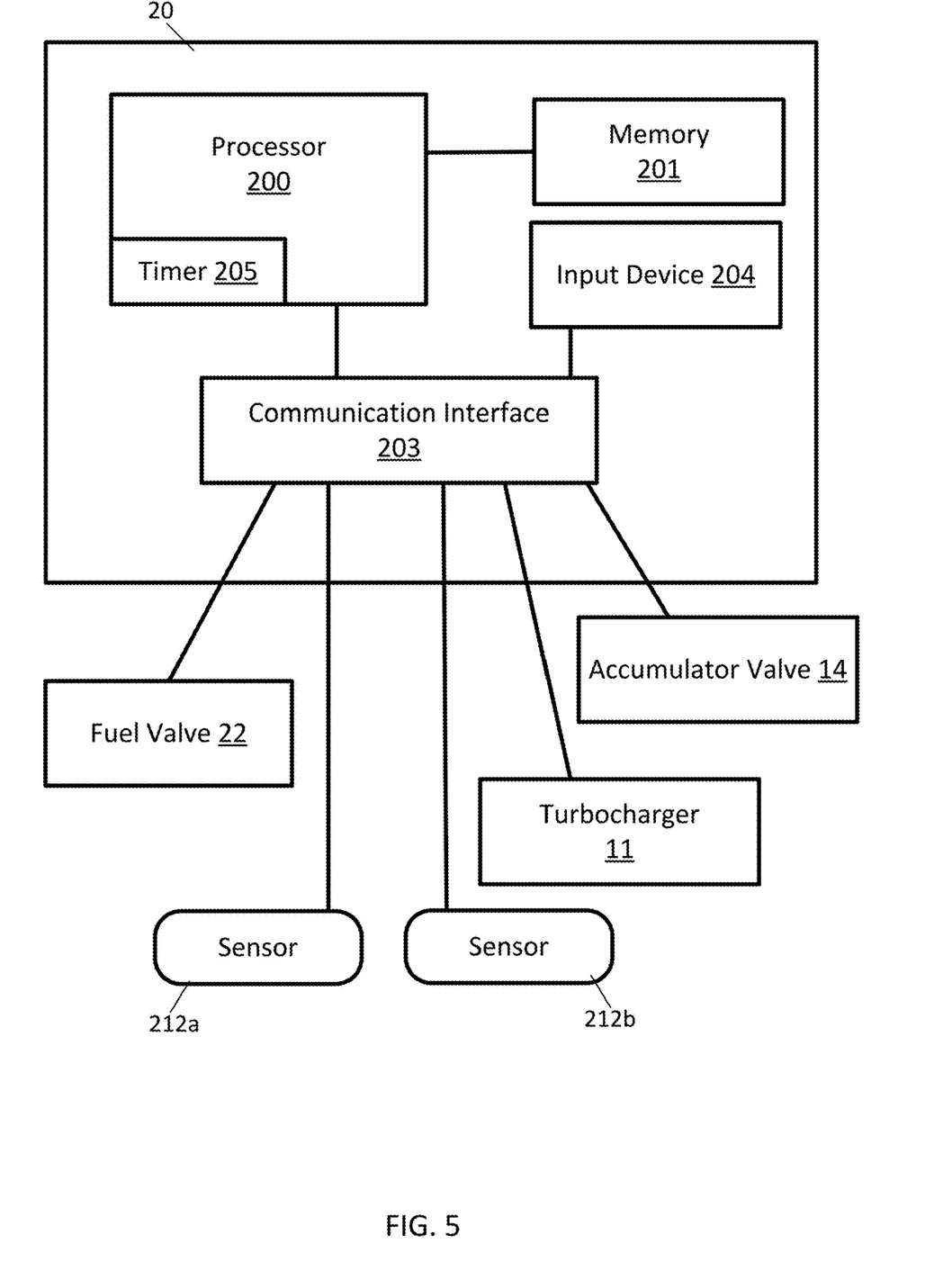
FIG. 5 illustrates a more detailed view of the controller.

FIG. 5 illustrates a more detailed view of the controller 20. The controller 20 may include a processor 200, a memory 201, an input device 204, and a communication interface 203. The communication interface 203 may communicate with one or more sensors such as sensor 212a and sensor 212b, the fuel valve 22, the accumulator valve 14, and the turbocharger 11. Additional, different, or fewer components may be included.

In one example, sensor 212a is sensor 212b are pressure sensors. The sensor 212a may be an accumulator pressure sensor mounted inside the accumulator. The sensor 212b may be an external pressure sensor mounted outside the accumulator. The sensor 212b may be in the intake, along the air-path passage, or in another location outside of the accumulator. The controller 20 compares the pressure detected inside and outside of the accumulator. When the pressure is higher outside of the accumulator, the controller 20 instructs the valve 14 to open the accumulator to let the air-fuel mixture in. Subsequently, when the pressure is higher inside of the accumulator, and also a trigger has been received, the controller 20 instructs the valve 14 to open to accumulator to release the air-fuel mixture.

Additional, or different sensors may be used. In one example, rather than pressure, the sensor 212a and sensor 212b may compare oxygen levels inside and outside of the accumulator. In another example, one or more of sensor 212a and 212b detects the loads on the engine.

In one alternative, only one of the sensors 212a and sensor 212b are included. For example, when only an internal pressure sensor is used. The controller 20 compares the pressure level from inside of the accumulator to a threshold value. When the pressure level from inside the accumulator exceeds the threshold, and also a trigger has been received, the controller 20 instructs the valve 14 to open to accumulator to release the air-fuel mixture.

In addition or in the alternative of the sensors, the controller 20 may include a timer 205 integrated with the processor 200, or separately provided in the controller 20. The controller 20 may open and close the accumulator valve 14 according to the timer 205. The timer 205 may specify a predetermined amount of time that the accumulator valve 14 is left open from filling the accumulator or for releasing the accumulator. Alternatively, the timer 205 may control the timing for opening and closing the accumulator valve 14 based on an engine timing sequence. The controller 20 may open the accumulator valve 14 in response to an event in the engine timing sequence (e.g., ignition, spark plug, crank) by a predetermined amount of time set by the timer 205.

Figure 6:
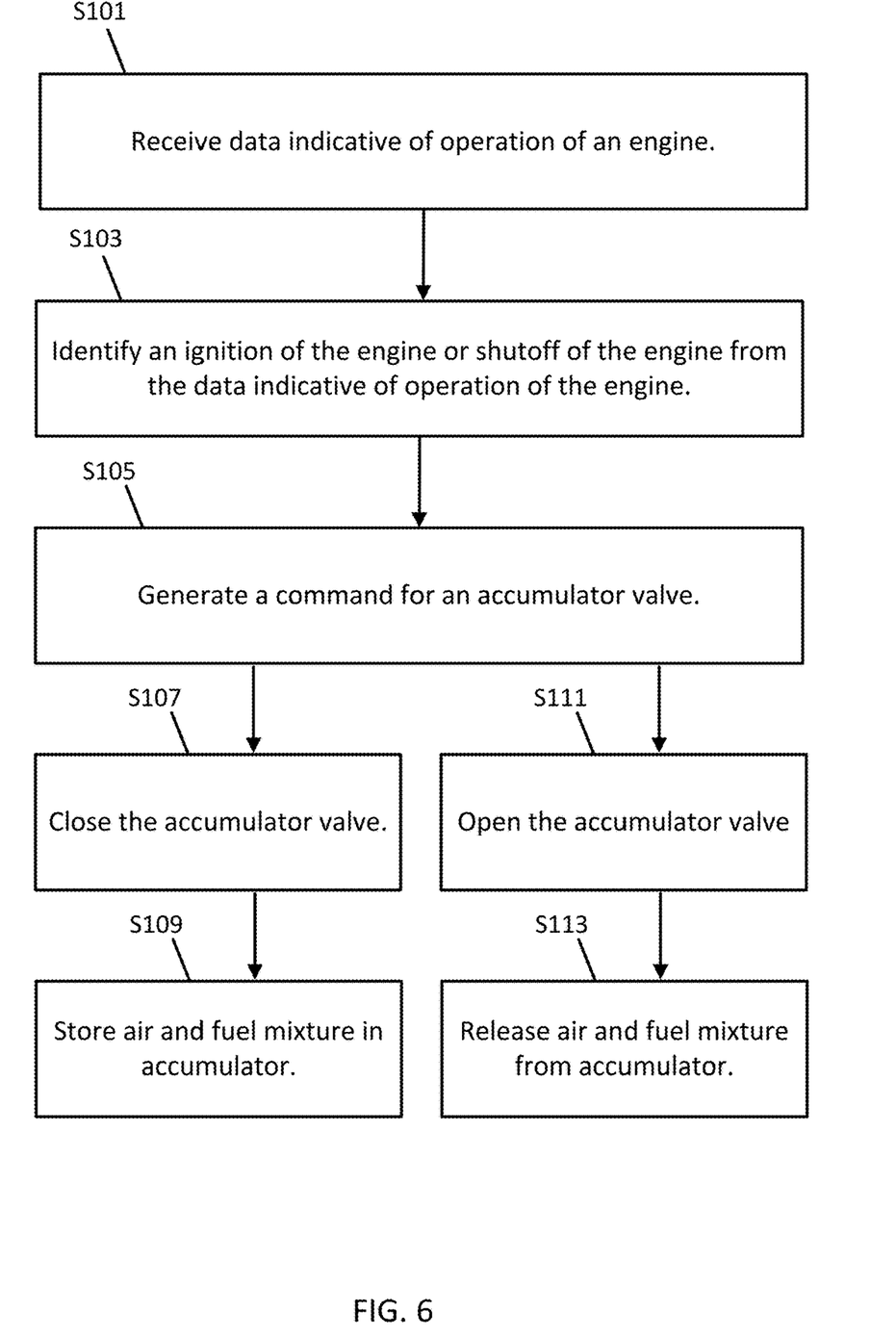
FIG. 6 illustrates an example flowchart for the controller of FIG. 5.

FIG. 6 illustrates an example flowchart for operation of the controller of FIG. 5 for controlling the accumulator device and/or an engine including the accumulator device. Additional, different, or fewer acts may be included.

At act S101, the controller 20 or the communication interface 203 is configured to receive data indicative of operation of an engine including an accumulator compartment. The data indicative of operation of the engine may include sensor data, user inputs, or other instructions.

At act S103, the controller 20 or the processor 200 identifies an ignition of the engine or shutoff of the engine from the data indicative of operation of the engine. In some examples, this may include extracting a code from the data that indicates whether the engine has been started or turned off. In some examples, this may include comparing sensor data to a threshold to determine whether the engine has been started or turned off. In some example, the controller 20 may be connected to a power signal that indicates whether the engine has been started or turned off (e.g., high voltage for ignition and/or low voltage for shutoff). The controller 20 may filter the data indicative of the operation of the engine to identify an ignition of the engine or a shutoff of the engine.

At act S105, the controller 20 or the processor 200 generates at least one command for an accumulator valve in response to the data indicative of operation of the engine. The at least one command for the accumulator valve opens the accumulator valve to release air and fuel mixture from the compartment or the at least one command for the accumulator valve closes the accumulator valve to store air and fuel mixture in the compartment.

At act S107, the accumulator valve closes the opening between the intake or charge air cooler and the compartment of the accumulator when the command for the accumulator valve is to close the valve when the data indicative of the engine includes a shutoff of the engine. At act S109, the air and fuel mixture is stored in the compartment of the accumulator in response closing the valve.

At act S111, the accumulator valve opens the opening between the intake or charge air cooler and the compartment of the accumulator when the command for the accumulator valve is to open the valve when the data indicative of the engine includes an ignition or startup of the engine. At act S113, the air and fuel mixture is released from the compartment of the accumulator in response closing the valve.

The acts of FIG. 6 may be repeated in multiple iterations. In some iterations, the acts S107 and S109 to close the valve are included and in other iterations acts S111 and S113 to open the valve are included. The process may be repeated such that the accumulator receives an air-fuel mixture from the engine at a first time, store the air-fuel mixture at a second time, and releases the air-fuel mixture to the intake at a third time.

The phrases "coupled with" or "coupled to" include directly connected to or indirectly connected through one or more intermediate components. Additional, different, or fewer components may be provided. Additional, different, or fewer components may be included.

The processor 200 may include a general processor, digital signal processor, an application specific integrated circuit (ASIC), field programmable gate array (FPGA), analog circuit, digital circuit, combinations thereof, or other now known or later developed processor. The processor 200 may be a single device or combinations of devices, such as associated with a network, distributed processing, or cloud computing.

The memory 201 may be a volatile memory or a non-volatile memory. The memory 201 may include one or more of a read only memory (ROM), random access memory (RAM), a flash memory, an electronic erasable program read only memory (EEPROM), or other type of memory. The memory 201 may be removable from the network device, such as a secure digital (SD) memory card.

In addition to ingress ports and egress ports, the communication interface 303 may include any operable connection. An operable connection may be one in which signals, physical communications, and/or logical communications may be sent and/or received. An operable connection may include a physical interface, an electrical interface, and/or a data interface.

The communication interface 203 may be connected to a network. The network may include wired networks (e.g., Ethernet), wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

The input device 204 may include a button, a switch, a key pad, a touchscreen, a key, an ignition, or other structure configured to allow a user to enter data or provide a command to operate the engine. The input device 204 may include a connection to a network, a smartphone, a tablet, a personal computer configured to electronically transmit the command to the engine. The communication may be wireless or wired (e.g., received by the communication interface 203).

While the computer-readable medium (e.g., memory 201) is shown to be a single medium, the term "computer-readable medium" includes a single medium or multiple media, such as a centralized or distributed database, and/or associated caches and servers that store one or more sets of instructions. The term "computer-readable medium" shall also include any medium that can store, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. The computer-readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Processors suitable for the execution of a computer program include, by way of example, both general and special purpose microprocessors, and anyone or more processors of any kind of digital computer. Generally, a processor may receive instructions and data from a read only memory or a random access memory or both. The essential elements of a computer are a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. An engine comprising:
   an intake;
   an air-fuel path coupled to the intake;
   an accumulator configured coupled to the air-fuel path and configured to store an air-fuel mixture; and
   at least one valve configured to selectively provide the air-fuel mixture from the engine to the accumulator at a first time and store the air-fuel mixture within the accumulator at a second time,
   wherein the accumulator provides the air-fuel mixture to the intake at a third time.

2. An engine comprising:
   an intake;
   an air-fuel path coupled to the intake;
   an accumulator configured coupled to the air-fuel path and configured to store an air-fuel mixture; and
   at least one valve configured to selectively provide the air-fuel mixture from the engine to the accumulator at a first time and store the air-fuel mixture within the accumulator at a second time,
   wherein the at least one valve is configured to open and close the accumulator as a function of a state of the engine.

3. The engine of claim 2, wherein the at least one valve is configured to open the accumulator in response to an ignition or an ignition command for the engine.

4. The engine of claim 2, wherein the at least one valve is configured to open the accumulator in response to a shutoff or a shutoff command for the engine.

5. The engine of claim 2, wherein the at least one valve is configured to close the accumulator in response to an elapsed time period measured from ignition of the engine or shutoff of the engine.

6. The engine of claim 2, further comprising:
   a turbocharger coupled to the air-fuel path, the turbocharger configured to pressurize the air-fuel mixture.

7. The engine of claim 6, wherein the at least one valve and the accumulator are along the air-fuel path between the intake and the turbocharger.

8. A method comprising:
   receiving data indicative of operation of an engine including an accumulator compartment; and
   generating at least one command for an accumulator valve in response to the data indicative of operation of the engine,
   wherein the at least one command for the accumulator valve opens the accumulator valve to release air and fuel mixture from the compartment or the at least one command for the accumulator valve closes the accumulator valve to store air and fuel mixture in the compartment.

9. The method of claim 8, further comprising:
   filtering the data indicative of the operation of the engine to identify an ignition of the engine or a shutoff of the engine.

10. The method of claim 9, wherein the at least one command closes the accumulator valve in response to the shutoff of the engine.

11. The method of claim 9, wherein the at least one command opens the accumulator valve in response to the ignition of the engine.

12. The method of claim 8, wherein the air and fuel mixture released from the compartment reduces a startup time for the engine.

13. An apparatus comprising:
   an accumulator configured coupled to an air-fuel path of an engine and configured to store an air-fuel mixture;
   at least one valve configured to selectively provide the air-fuel mixture from the engine to the accumulator at a first time and store the air-fuel mixture within the accumulator at a second time; and
   a controller configured to provide a plurality of commands to the at least one valve, the plurality of commands including an open command to release air and fuel mixture from the accumulator and a close command to store air and fuel mixture in the accumulator.

14. The apparatus of claim 13, wherein the controller is configured to generate a wastegate command to fill the accumulator.

15. The apparatus of claim 13, wherein the plurality of commands are provided at different times.

16. The apparatus of claim 13, wherein the plurality of commands are provided according to a predetermined schedule.

17. The apparatus of claim 13, wherein the predetermined schedule is defined in response to an ignition of the engine, a throttle of the engine, or an accelerator associated with the engine.

18. The apparatus of claim 13, wherein the controller receives sensor data from one or more sensors and generates the plurality of commands in response to the sensor data.

19. The apparatus of claim 18, wherein the one or more sensors includes an oxygen sensor, an air fuel sensor, or a pressure sensor.

20. The engine of claim 1, further comprising:
   a turbocharger coupled to the air-fuel path, the turbocharger configured to pressurize the air-fuel mixture.

* * * * *